April 21, 1970   C. E. JENNRICH ET AL   3,507,163
SEALED MANIPULATOR
Filed Nov. 8, 1968   3 Sheets-Sheet 1
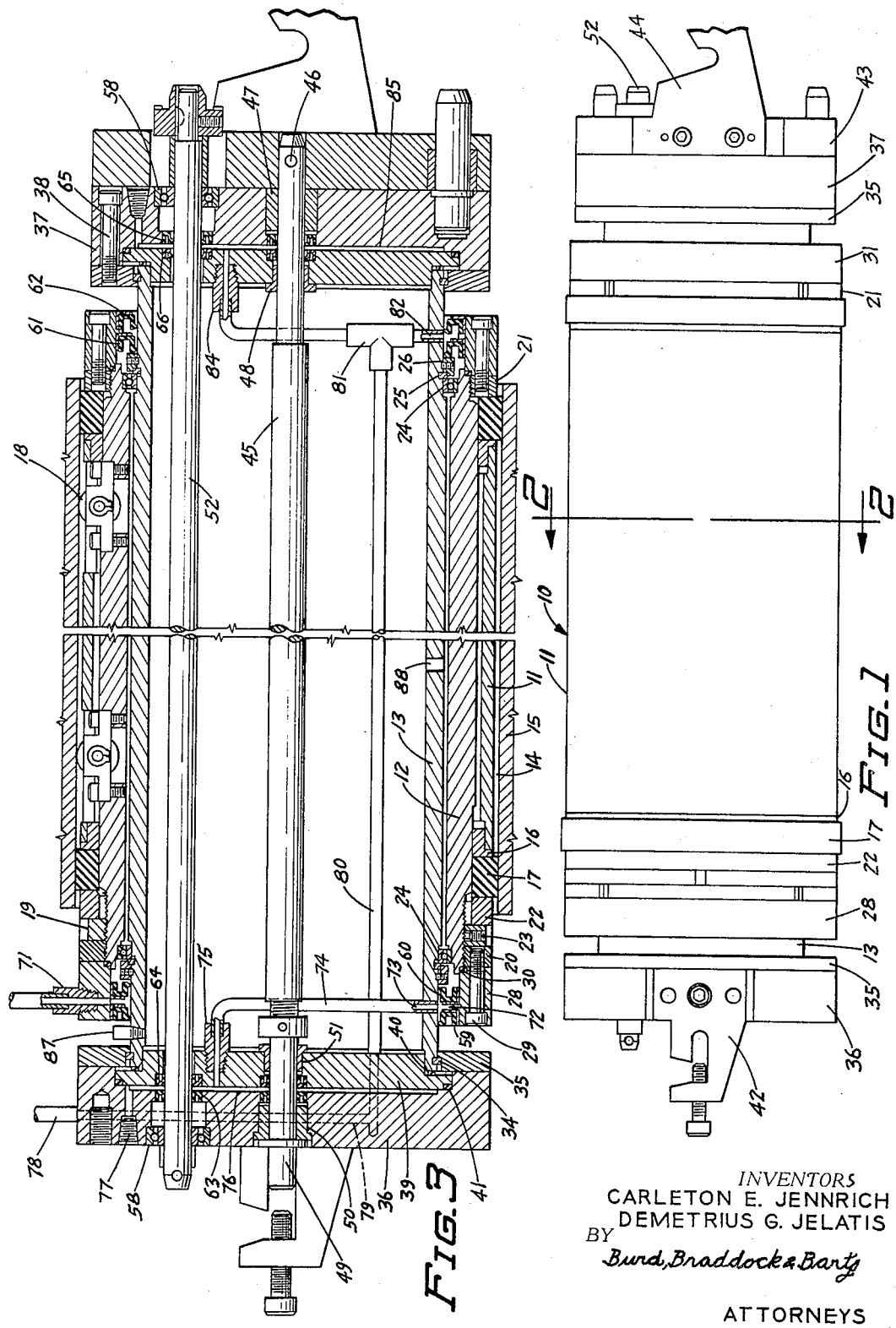
INVENTORS
CARLETON E. JENNRICH
DEMETRIUS G. JELATIS
BY
Burd, Braddock & Bartg
ATTORNEYS

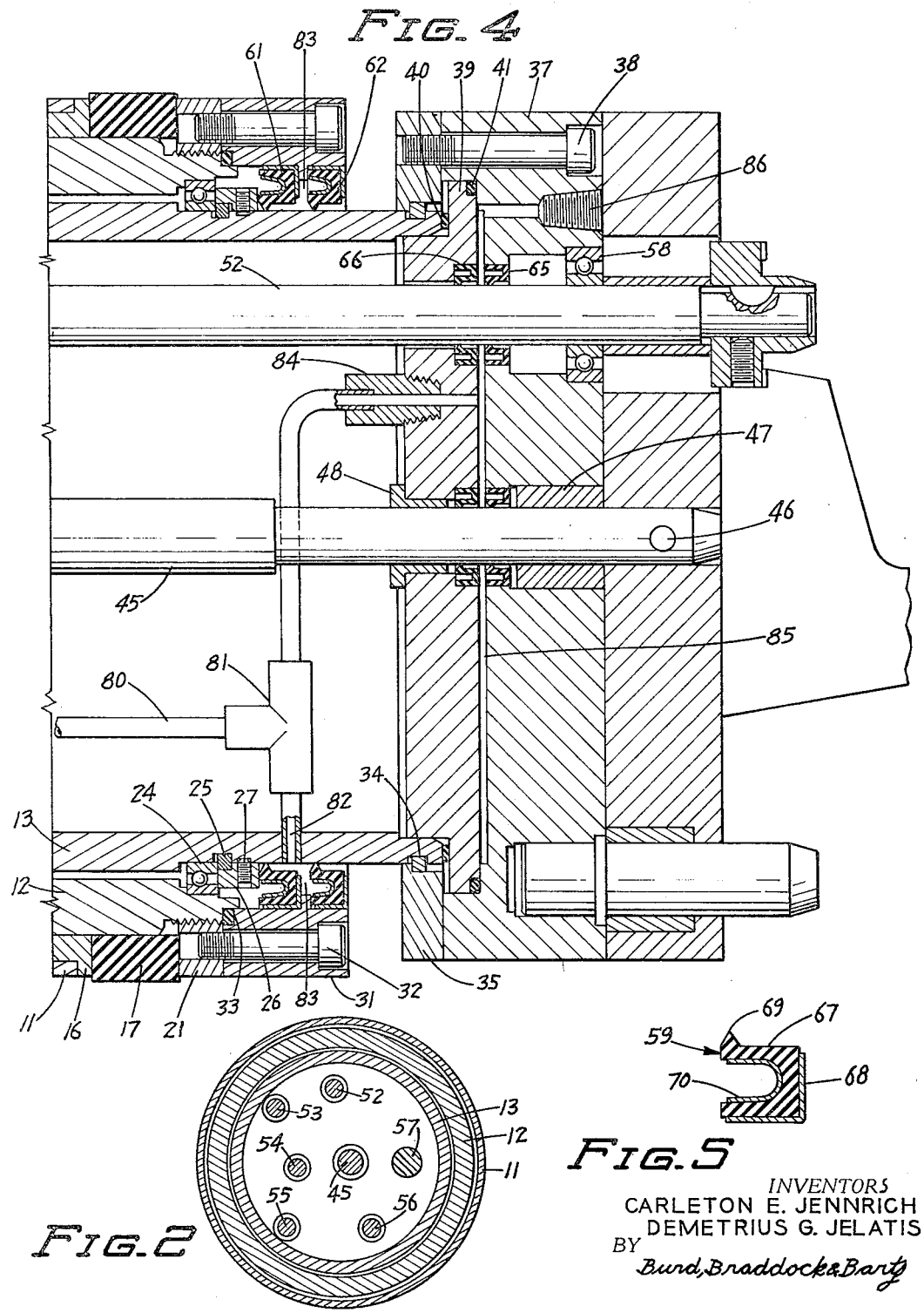

April 21, 1970  C. E. JENNRICH ET AL  3,507,163

SEALED MANIPULATOR

Filed Nov. 8, 1968  3 Sheets-Sheet 3

INVENTORS
CARLETON E. JENNRICH
DEMETRIUS G. JELATIS
BY
Burd, Braddock & Bartz

ATTORNEYS

United States Patent Office 3,507,163
Patented Apr. 21, 1970

1

3,507,163
SEALED MANIPULATOR
Carleton E. Jennrich, St. Paul, and Demetrius G. Jelatis, Red Wing, Minn., assignors to Central Research Laboratories, Inc., Red Wing, Minn., a corporation of Minnesota
Filed Nov. 8, 1968, Ser. No. 774,468
Int. Cl. G05g 1/00
U.S. Cl. 74—491
11 Claims

ABSTRACT OF THE DISCLOSURE

A sealed horizontal support or through tube for a remote control master-slave manipulator of the type in which motions are transmitted by rotatable shafts. The through tube is characterized by fluid filled seals each comprised of a double set of spaced apart seal rings at each end of the through tube engaging each of the rotatable elements extending through the barrier wall separating the master and slave environments. The structure of the through tube permits equalization of pressure on opposite sides of most seals. Where pressure differentials exist, the greater pressure is on the side insuring maintenance of the integrity of the seal. This adapts the through tube especially for use where the slave cell is at a different pressure from the operator's area.

---

This invention relates to remote control master-slave manipulators of the type used by an operator to perform certain manipulative functions in some area remote from the operator as, for example, on the opposite side of a shielding barrier wall. In many instances, because of the nature of the materials being handled and the work being performed, it is desirable that the area in which the slave arm of the manipulator functions be completely sealed from the environment of the operator. For example, in high level alpha-gamma hot cells the safety of the operator requires such sealing. Other cells require complete atmosphere control where handling pyrophoric or otherwise atmosphere sensitive materials. Other cells handle highly toxic gaseous or air borne particulate materials under circumstances involving risk of dissemination by explosion or other accident. Some cells require a vacuum environment or are purged of air and moisture by alternating evacuation and flushing with inert gas.

Manipulators of this general type include a horizontal support which extends through the shielding or barrier wall, a master arm mounted on one end of that support in the safe area and a slave arm mounted on the opposite end of the horizontal support in the work area. By means of movement of a handle engaged by the operator on the master arm, motions are transmitted through the horizontal support to the slave arm to perform work in the remote area on the opposite side of the barrier wall.

The present invention is directed particularly to a sealed horizontal support, or through tube, for a manipulator characterized by the provision of a plurality of fluid filled positive rotary seals permitting transmission of rotary motion through the barrier wall with assurance both of the safety of the operator and the integrity of the work cell. The manipulator of which the sealed through tube of the present invention is intended to be a part is of the type in which linear motions of the handle on the master arm are converted to rotary motion, transmitted through the horizontal support by means of a plurality of rotatable shafts, and then reconverted into linear motions to manipulate tong means on the slave arm to perform the desired work. One such manipulator and one form of sealed through tube are exemplified by that described and illustrated in United States Patent No. 3,295,389 issued to Hans Wälischmiller on Jan. 3, 1967.

2

The sealed through tube according to the present invention represents an improvement over the prior art by providing for positive fluid filled seals at both ends of the through tube. This permits controlling the pressure in the space between each pair of seals and between each double set of seals at opposite ends of the through tube so as to minimize or eliminate pressure differentials on opposite sides of the seals. This permits use of the manipulator in environments where there are great pressure differentials between the slave cell and the operator's area. It also permits maintenance of the integrity of the seals in the event of rapid pressure changes as, for example, might occur if there is an explosion in the slave cell.

The invention is illustrated in the accompanying drawings in which the same numerals are used to identify corresponding parts and in which:

FIGURE 1 is a side elevation of the sealed horizontal support or through tube for a remote control master-slave manipulator according to the present invention;

FIGURE 2 is a transverse section on the line 2—2 of FIGURE 1 and in the direction of the arrows;

FIGURE 3 is a longitudinal vertical section through the horizontal support shown installed in a barrier wall and shown on a slightly enlarged scale;

FIGURE 4 is a fragmentary longitudinal section of the slave cell end of the sealed horizontal support on a further enlarged scale;

FIGURE 5 is an enlarged section through a resilient seal ring to show the details of construction thereof.

Figure 6:
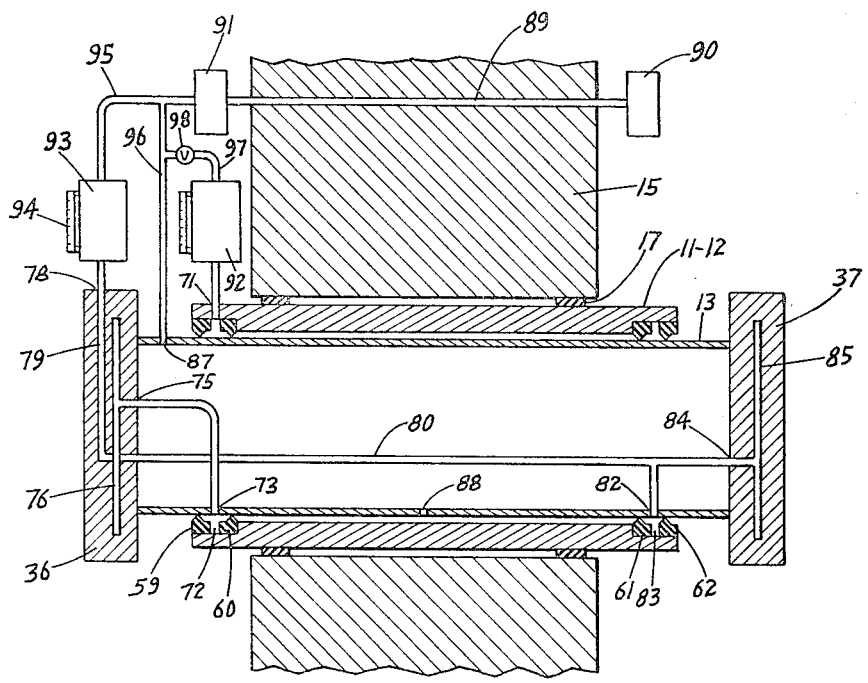
FIGURE 6 is a schematic view of a manipulator through tube installed in a barrier wall with a pressure control system.

Referring now to the drawings, the horizontal manipulator support or through tube, indicated generally at 10, comprises an outer composite tubular stationary shell 11–12 and an inner rotatable tubular shell 13 located within and extending beyond the ends of the outer shell. The through tube assembly 10 is installed in a circular opening 14 in a barrier wall 15 separating the slave cell from the operator's area. The ends of outer tubular shell segment 11 are supported in a pair of retainer rings 16 whose outward faces serve as shoulders for rubber compression rings 17. A plurality of rollers 18 are desirably mounted in the outer shell, extending through openings in shell portion 11, to facilitate insertion of the through tube in the opening 14 in the barrier wall 15.

The ends of outer shell portion 12 are exteriorly threaded and a pair of threaded rings 19 and 20 are carried thereby at the master arm end of the through tube and a corresponding threaded ring 21 is carried thereby at the slave arm end. At the master arm end a spacer ring 22 is located between threaded ring 19 and compression ring 17. Threaded ring 21 serves as an anchor or stop for force applied against the compression rings. The compression rings 17 are compressed longitudinally and expanded radially into contact with the wall of opening 14 in the barrier wall, not only to seal the space between the opening surface and through tube but to hold the through tube assembly firmly in the barrier wall. Threaded ring 19 is screwed down to press against spacer ring 22 which bears against master compression ring 17, which in turn bears against outer shell segment 11 and its retainer rings 16 to press slave compression ring 17 against threaded ring 21. Threaded ring 19 is locked in place by means of a plurality of set screws 23 spaced around the periphery of the ring.

Inner tube 13 is journaled for rotation in ball bearings 24 set in annular recesses at opposite ends of the inside surface of outer shell segment 12 and the outer surface of the inner tube 13. The bearings are held by means of split rings 25 snapped into annular grooves around the outside of the inner tube 13 and held securely in place by means of retainer rings 26 which in turn are secured by set screws 27 spaced about the periphery of the rings. A seal-supporting ring 28 is secured by means of a plurality of screws 29 to threaded ring 20 at the master arm end of the through tube. An O-ring 30 forms a seal between ring 28 and the end of outer shell segment 12. A similar seal-supporting ring 31 is secured to threaded ring 21 by means of screws 32 at the slave arm end of the through tube and O-ring 33 forms a seal between ring 31 and the slave arm end of the inner segment 12 of the stationary outer shell.

Each end of rotatable inner tube 13 has a peripheral groove in which is snapped a split ring 34. The lip of a flanged mounting ring 35 bears against the split ring which is retained in place by the inner periphery of the mounting ring. End plates 36 and 37 are secured to these mounting rings at the master and slave arm ends of the through tube, respectively, secured as by means of screws 38. The inner face of each of the end plates has a circular recess of diameter somewhat greater than the diameter of the inner rotatable tube 13. A radially flanged inner plate 39 is fit into that recess, the inner face of the flange bearing against the end of the tube 13 and being sealed by means of a compressible plastic ring gasket 40, the opposite face of the flange bearing against a raised shoulder in the recessed portion of the respective end plates and being sealed by O-rings 41.

A pair of ears 42 are secured to the master arm end plate 36 for the purpose of supporting the master arm of the manipulator. An auxiliary end plate 43 is secured to the slave end plate 37 and in turn carries a pair of ears 44 for supporting the slave arm of the manipulator. The auxiliary end plate assembly is secured to the rotatable through tube assembly to rotate therewith by means of a two part threaded draw bar, one end 45 of which is anchored, as by a pin 46 in the auxiliary slave end plate 43 and extends through bushings 47 and 48. The other end 49 of the draw bar extends through bushings 50 and 51 of the master end plate and screws into the first end of the draw bar. Tightening of the two ends of the draw bar draws the auxiliary slave end plate 43 for mounting the slave arm against the slave end plate 37 to form a rigid rotatable assembly.

As is well understood in the art and best seen in FIGURE 2, a plurality of rotatable shafts 52–57 extend from the operator's area on the master arm end of the through tube, through the end plates and interior of tubular shell 13 to the slave cell for transmitting, respectively, Z motion, azimuth motion, tong motion, elevation and twist motions and Y motion. Shaft 52 for transmission of Z motion is exemplary and is shown in detail. As seen in FIGURE 3, the opposite ends of shaft 52 are journaled in bearings 58 carried by the end plates at opposite ends of the through tube. As is also well understood in the art, appropriate coupling means are secured to the opposite ends of the shafts for coupling with the master and slave arms for transmission of the appropriate motion.

Each of the rotatable elements, that is the rotatable portion of the through tube carried by inner tubular shell 13, the draw bar 45 and motion transmission shafts 52–57 is provided with a fluid filled resilient seal against passage of noxious or other dangerous materials, or loss of pressure or vacuum, between relatively rotatable surfaces in the course of use of the manipulator. Inner tubular shell 13 is sealed in the course of its rotation by two double sets of resilient seal rings, seal rings 59 and 60 at the master arm end and seal rings 61 and 62 at the slave arm end. The seal rings are carried by the seal-supporting rings 28 and 31, respectively. Similarly, the draw bar and rotatable shafts are sealed by two double sets of pairs of seal rings, seal rings 63 and 64 carried by the master arm end plate and seal rings 65 and 66 carried by the slave arm end plate.

As best seen in FIGURE 5, all of the seal rings are of the same general construction comprising a resilient U-shaped body portion 67, preferably formed of elastic nitrile rubber, bonded to a flanged ring 68. One leg of the U-shaped rubber body is provided with an outwardly projecting lip 69, the end of which functions as the sealing surface. A U-shaped spring 70 seated within the channel of the U-shaped rubber body urges the ends of the body apart urging sealing lip 69 into tight engagement with the rotatable surface.

As shown, each of the seals is made up of a pair of spaced apart sealing rings which together form an annular chamber which is filled with a fluid, such as oil (vacuum oil where the slave cell is evacuated), supplied from reservoirs as described hereinafter. An oil filling port 71 in the top of the outer shell assembly communicates with the annular chamber 72 between the main seal rings 59 and 60 at the master arm end of the through tube. A port 73 through inner tube 13 from annular chamber 72 communicates with a duct 74 and a port 75 with an oil chamber 76 formed between the segments of the master arm end plate. Chamber 76 communicates directly with the several annular chambers formed between seal rings 63 and 64 sealing the shafts extending through the master arm end plate. A further port 77, adapted to be closed with a screw plug, is provided for the purpose of bleeding air from the system as the oil is introduced therein.

A port 78 in the top of master arm end plate 36 communicates with a channel 79 through the end plate segments 36 and 39 (sealed from chamber 76) which communicates with a duct 80 to a mainfold 81. Manifold 81 is connected to a port 82 through the inner tubular shell 13 to the annular space 83 between the slave end main seal rings 61 and 62. Manifold 81 is also connected to a port 84 communicating with an oil chamber 85 formed between the segments of the slave arm end plate and communicating with the annular spaces between the seal rings 65 and 66 sealing the shafts extending through the slave end plate. A port 86 closed with a screw plug is provided for the purpose of bleeding air from the slave end sealing system as oil is introduced into that system. A port 87 extending through the wall of inner tubular shell 13 at the master end is provided for the purpose of pressurizing the interior space so as to assist in equalizing pressure on opposite sides of some of the several seal rings. A port 88 is provided for the purpose of equalizing the pressure in the space between tubular shells 13 and 12 with that in the interior of tubular shell 13.

Referring now to FIGURE 6, there is shown schematically the installation of a sealed through tube according to the present invention in a barrier wall 15 separating the operator's area on the left hand side of the wall from the slave cell area on the right hand side. The installation shown is especially adapted for conditions in which the slave cell is maintained under vacuum or is purged of air and moisture by alternately evacuating the cell filling with an inert gas of known composition, re-evacuating, etc. until the desired slave cell environment is achieved. In order that the several fluid filled sealing systems of the through tube may be maintained at the same pressure (positive or negative) as the slave cell, a duct 89 extends through the barrier wall. Filters 90 and 91 are provided to remove whatever noxious substance may be present in the slave cell. Reservoirs 92 and 93 are connected, respectively, to the oil inlet ports 71 and 78 of the master end and slave end sealing systems. Each reservoir is provided with a sight glass 94 so that the oil level can be visually determined to insure that adequate oil is present. Reservoir 93 supplying oil to the sealing system at the slave arm end of the through tube is connected through duct 95 to duct 89 so as to be under the same pressure as the slave cell. Port 87 to the space in the inner tubular shell 13 is also connected to duct 89 through duct 96. Reservoir 92 containing oil for the sealing system at the master arm end of the through tube is similarly connected through duct 97. A three-way valve 98 is provided to connect reservoir 92 to the slave cell or the master arm ambient pressure so that the pressure on the master end sealing system may be independent of the slave end.

In order to maintain the integrity of the seals and of the environment in the slave cell, it is essential that oil does not flow from the oil chambers supplying the seals into the surrounding environment, particularly into the slave cell. The equalization of pressures possible with the system, according to the present invention, minimizes the possibility of such leakage. As an example, if the slave cell is to be evacuated, then the independent sealing systems for the master arm and slave arm ends of the through tube and the space between the double sets of main seals sealing the rotary portion of the through tube, are all connected through duct 89 so as to be at the same pressure as the slave cell. This means that the pressures on both sides of each of main slave seals 61 and 62 is the same, similarly the pressure on both sides of each of slave shaft seals 65 and 66 is the same. The pressure on both sides of main master seal 60 is the same. The pressure on the operator's side of main master seal 59 is greater than that on the other fluid side, but because of the orientation of seal rings 59, this greater pressure tends to force the sealing lip of seal 59 into tight engagement with tubular shell 13 to maintain the integrity of the seal. Similarly, the pressure on opposite sides of master shaft seals 64 is the same. Pressure on the operator's side of mater shaft seals 63 is greater than the pressure on the opposite side so that the sealing lips of seals 63 are maintained in tight sealing engagement with the shafts.

If the slave cell is maintained under vacuum, the system as described is maintained. However, if the slave cell after purging with an inert or other desired gas is maintained at a higher near-ambient pressure, then after evacuation and filling of the slave cell is complete, by means of valve 98 the pressure on the master arm seal system is restored to the ambient pressure of the operator's area while the space between the double sets of main seals and the slave arm sealing system are maintained at the slave cell pressure. In the event of a sudden pressure build-up, as might be caused by an explosion, this pressure build-up would be transmitted through the duct 89 to the slave end sealing system and to the space between the double sets of main seals. Thus, pressure would still be equalized on both sides of each of slave main seals 61 and 62 and each of slave shaft seals 65 and 66. The pressure would be equalized on opposite sides of master main seal 59 and master shaft seals 63, this being the ambient pressure. The ambient pressure on the operator's side of master main seal 60 and master shaft seals 64 would be less than the explosive pressure on the opposite side of those seals. However, because of the orientation of seal rings 60 and 64, that greater pressure would again tend to force the sealing lips of the seals into tight engagement with the abutting rotary surfaces to maintain the integrities of the seals and afford protection for the operator. The sealing system is thus effective whether the slave cell is at a higher or lower pressure than the operator's area.

The embodiments of the invention in which an exclusive property and privilege is claimed are defined as follows:

1. In a sealed manipulator through tube for a remote control master-slave manipulator of the type in which motions are transmitted from the operator's area on one side of a barrier wall to a slave cell on the opposite side of the wall by a plurality of rotary elements, the improvement which consists in:
   (A) a double set of spaced apart pairs of elastic seal rings engaging each of said rotary elements, one of said pairs of sealings being adjacent the master arm ends of each of said rotary elements and the other of said pairs of sealings being adjacent the slave arm ends of the rotary elements;
   (B) the space between said double sets of seal rings being sealed;
   (C) the space between the seals of said pairs of seal rings being filled with a sealing fluid; and
   (D) means for independently regulating pressures within said spaces between individual seals.

2. A manipulator through tube according to claim 1 further characterized in that:
   (A) the annular spaces between said pairs of seal rings adjacent the master arm ends of the rotary elements are in common communication with a reservoir of sealing fluid;
   (B) the annular spaces between said pairs of seal rings adjacent the slave arm ends of the rotary elements are in common communication with a reservoir of sealing fluid; and
   (C) port means are provided to communicate with the space between said double sets of pairs of seal rings.

3. A manipulator through tube according to claim 2 further characterized in that:
   (A) said sealing fluid reservoirs for the pairs of seal rings adjacent opposite ends of the rotary elements are separate and independent of one another; and
   (B) each of said sealing fluid systems is provided with port means whereby the systems may be separately and independently pressurized.

4. A manipulator through tube according to claim 1 further characterized in that there is provided:
   (A) an outer tubular shell adapted to be fixed in a barrier wall;
   (B) an inner tubular shell journaled to rotate within said outer shell;
   (C) one pair of seal rings between said shells adjacent the opposite ends thereof;
   (D) an end plate over each end of said inner shell;
   (E) said rotary elements comprising a plurality of rotary shafts extending through said inner shell and end plates; and
   (F) each set of said seal rings comprising one pair of seal rings housed within said end plates and extending around each of said shafts.

5. A manipulator through tube according to claim 4 further characterized in that said outer tubular shell is provided with a pair of longitudinally compressible and radially expandable rings adjacent each end for sealing said through tube in a barrier wall and holding the outer shell stationary therein.

6. A manipulator through tube according to claim 4 further characterized in that:
   (A) the annular spaces between said pairs of seal rings adjacent the master arm ends of the rotary elements are in common communication with a reservoir of sealing fluid;
   (B) the annular spaces between said pairs of seal rings adjacent the slave arm ends of the rotary elements are in common communication with a reservoir of sealing fluid; and
   (C) port means are provided to communicate with the space between said double sets of pairs of seal rings.

7. A manipulator through tube according to claim 6 further characterized in that said inner shell is provided with:
   (A) at least one port disposed between the sets of pairs of seal rings at opposite ends thereof and commmunicating with the space between the inner and outer shells; and
   (B) a further port at the master arm end communicating with the space within the inner shell.

8. A manipulator through tube according to claim 7 further characterized in that:
   (A) the outer shell of said through tube is fixed against rotation in a barrier wall and sealed therein;
   (B) a pressure equalizing duct is provided extending through said wall and in communication with the slave cell side of the wall;
(C) means are provided for connecting said pressure equalizing duct to each of said ports; and
(D) valve means are provided for controlling communication between said duct and ports.

9. A manipulator through tube according to claim 8 further characterized in that said pressure equalizing duct is provided with filter means to prevent passage of noxious materials from the slave cell while permitting equalization of pressure.

10. A manipulator through tube according to claim 1 further characterized in that each of said seal rings comprises:
(A) a U shaped resilient body of elastic material;
(B) a projecting seal lip extending outwardly from one side of said body adjacent the open end; and
(C) a resilient spring within said body urging the sides thereof outwardly.

11. A manipulator through tube according to claim 10 further characterized in that:
(A) said pairs of seal rings adjacent the master arm ends of said rotary elements are disposed in back-to-back relation; and
(B) said pairs of seal rings adjacent the slave arm ends of said rotary elements are disposed in face-to-back relation with the open faces in the direction of the operator's area.

References Cited

UNITED STATES PATENTS 2,951,448  9/1960  Rushing.

MILTON KAUFMAN, Primary Examiner

U.S. Cl. X.R.

214—1; 277—59

PO-1050
(5/69)

UNITED STATES PATENT OFFICE
CERTIFICATE OF CORRECTION

Patent No. 3,507,163     Dated April 21, 1970

Inventor(s) Carleton E. Jennrich et al

It is certified that error appears in the above-identified patent and that said Letters Patent are hereby corrected as shown below:

Claim 1, lines 9 and 11, "sealings" should be --seal rings--.

Signed and sealed this 18th day of June 1974.

(SEAL)
Attest:

EDWARD M. FLETCHER, JR.
Attesting Officer

C. MARSHALL DANN
Commissioner of Patents